April 13, 1965 R. H. COLE 3,178,595
PULSE PEAK DETECTOR CIRCUIT
Filed Oct. 15, 1962 3 Sheets-Sheet 1

ROBERT H. COLE
INVENTOR.

BY
Richard P. Albert
AGENT

April 13, 1965        R. H. COLE        3,178,595

PULSE PEAK DETECTOR CIRCUIT

Filed Oct. 15, 1962        3 Sheets-Sheet 2

ROBERT H. COLE
INVENTOR.

BY

Richard P. Alberi
AGENT

ROBERT H. COLE
INVENTOR.

AGENT

United States Patent Office 3,178,595
Patented Apr. 13, 1965

3,178,595
PULSE PEAK DETECTOR CIRCUIT
Robert H. Cole, Canoga Park, Calif., assignor, by mesne assignments, to The Bunker-Ramo Corporation, Stamford, Conn., a corporation of Delaware
Filed Oct. 15, 1962, Ser. No. 230,325
12 Claims. (Cl. 307—88.5)

This invention relates to electrical pulse detecting means, and, more particularly, to an improved electrical circuit for accurately detecting the positions of incoming pulses with respect to time, even though the pulses may vary in shape, and providing output pulses of uniform shape that accurately reflect the positions of the input pulses with respect to time.

In the past, pulse detecting circuits have been used, for example, with means for reading out information stored on a magnetic tape. Such pulse detecting circuits generally sense the position of the leading edge of the incoming pulse and provide a new pulse, which is supposed to indicate the position of the incoming pulse with respect to time. Generally these circuits only detect a pulse which exceeds a given magnitude. This is accomplished by biasing the circuit to allow only pulses exceeding a given magnitude to pass through the circuit. The present-day pulse detecting circuits, which are quite adequate for reading a single-channel magnetic tape, provide an output pulse when the input pulse leading edge crosses the bias point. However, where several channels of recorded signals are to be read from a magnetic tape, magnetic drum, or the like, it is quite possible and generally true that the pick-up circuits for the different channels do not shape their pulses exactly alike. That is, the peaks of the incoming pulses may have approximately the same amplitudes and positions with respect to time, but an incoming pulse from one channel may have a different shape to its leading edge than that of a simultaneously occurring incoming pulse from another channel.

It is obvious, then, that the leading edge of the first incoming pulse may cross the bias point at some time prior to or subsequent to the time at which the leading edge of the second incoming pulse crosses the bias point. Thus, if the positions of the leading edges of the two incoming pulses are detected and utilized to generate two output pulses, which are then compared and used for information-carrying purposes, it is difficult to determine from the two output pulses whether or not the two incoming pulses both occurred within a given time interval. The problem becomes more acute as the density of the incoming pulses increases, thereby decreasing the time between consecutive pulses; that is, when there is, for example, one second between incoming pulses on two different channels, it is relatively easy to determine that two incoming pulses, which have their leading edges crossing the bias point within one-tenth of a second of each other, do, in fact, occur in the same time interval and should be considered as if their positions, with respect to time, are the same. However, if the time between consecutive incoming pulses on a channel is only a microsecond or the like, a very small difference in the positions of the leading edges of incoming pulses from two or more channels presents a major problem.

The present invention solves the above-mentioned problem by sensing the peaks of the incoming pulses as opposed to sensing the leading edges of the incoming pulses. In addition, the invention provides a circuit that is relatively insensitive to noise, because an input signal is not recognized as a pulse and acted upon unless it fulfills a plurality of conditions.

The present invention provides an improved pulse detection circuit which, in broad terms, comprises a first circuit which provides a first signal proportional in magnitude to the first derivative of the input signal. This first signal indicates the position of the peak of the input pulse. A second circuit provides a second signal which is proportional to the second derivative of the input signal. This signal is obtained only when the first signal passes through zero. The second signal is generally not provided as a result of noise input signals. A third circuit provides a third signal when the frequency of the input signal is below a predetermined frequency. Thus, high frequency noise signals do not cause the third signal to be provided. An AND gate receives the first, second, and third signals and provides a fourth signal if the first, second, and third signals are all present. Consequently, the majority of the signal variations or noise in the incoming signal are filtered out by the AND gate because without the presence of the second and third signals, which are normally not provided in response to noise signals, there is no output from the gate. The position of the steep leading edge of the output signal of the gate circuit corresponds in time to the peak of the input pulse.

In a preferred embodiment of the present invention, the fourth signal is differentiated, and the resultant fifth signal is passed to a multivibrator. The output of the multivibrator is a square wave signal, with the leading edge of each pulse representing, with respect to time, the position of the peak of the incoming signal.

A better understanding of the features and advantages of the present invention will be had from the following description when taken in conjunction with the drawings, in which.

It should be noted that the circuit described below is that required for one channel. When input signals are to be received from a plurality of channels, a plurality of like circuits are used, one for each channel.

Figure 1:
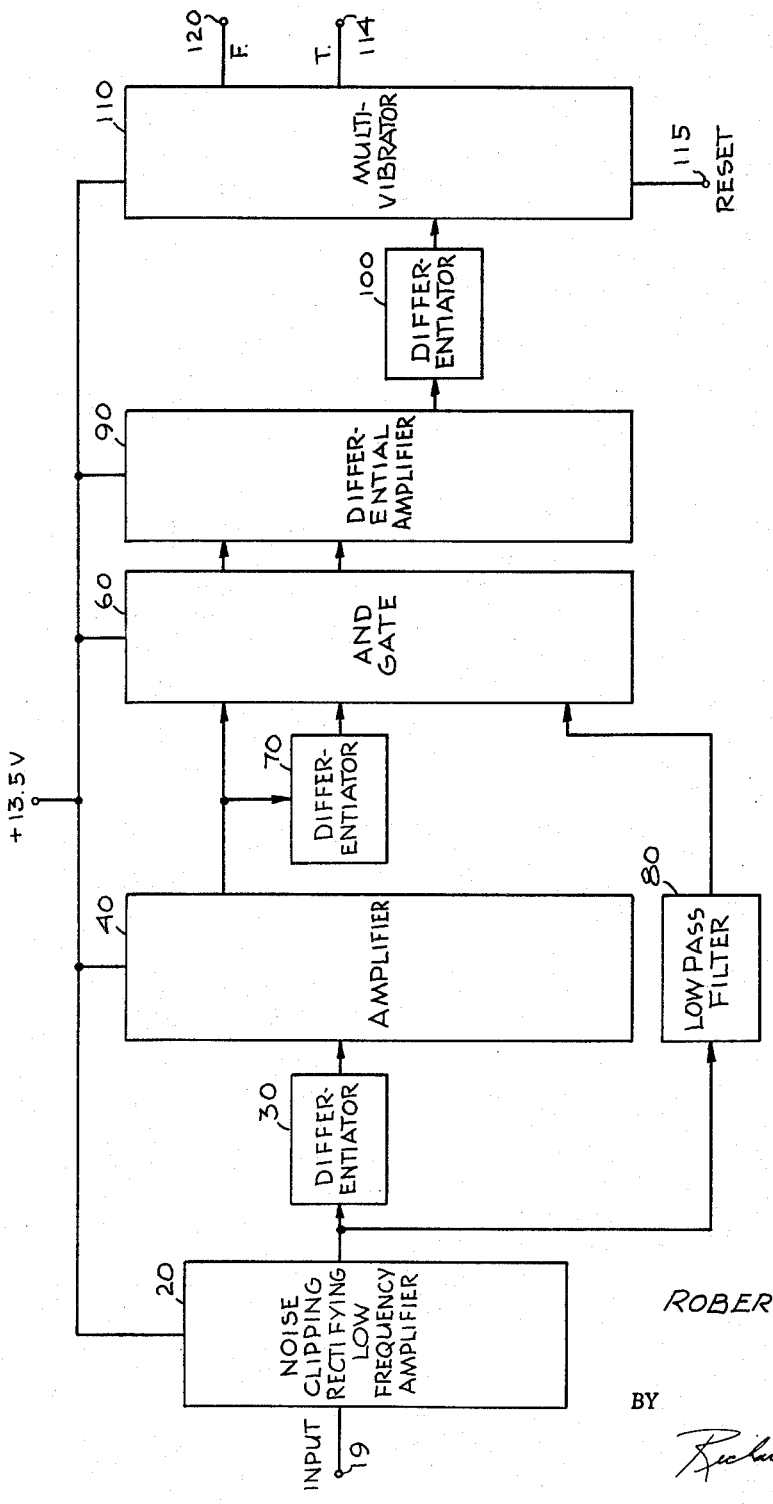
FIGURE 1 is a block diagram of the circuit of the invention.

As seen from the block diagram of FIG. 1, the amplifier 20 is capable of receiving a bipolar electrical pulse signal. Such a signal, which is the type normally used in computers, generally alternates between positive and negative excursions from a base line. The amplifier contains rectifying means therein to convert the bipolar input signal into unipolar pulse signals. However, if the input signal is unipolar, the rectifying means obviously is not necessary and can be eliminated. Amplifier 20 also contains clipping means, which operate on the incoming pulse signal so that only the peak portions of the input signal are amplified. This clipping action eliminates many low level noise signals. The amplifier also performs its more basic function of amplifying the input signal.

The output signal of amplifier 20, which is an amplified version of the pulse input signal, passes to a differentiator 30 and a low-pass filter 80. Differentiator 30 provides an output signal which is the first derivative of the input signal. As such, the first derivative signal inherently has a zero crossing (i.e., the signal goes from one polarity to another) at a point in time comparable to the point in time at which the pulse input signal reaches a peak.

The low-pass filter 80 filters out any signal having a frequency above a predetermined frequency.

The first derivative signal from the differentiator 30 is amplified by an amplifier 40. In this particular embodiment, amplifier 40 has four stages, although it may have any required number.

A differentiator 70 receives the amplified first derivative signal, and again differentiates it to provide a signal representing the second derivative of the input signal.

An AND gate 60 receives the amplified first derivative signal, the second derivative signal, and the input pulse signal if it is passed by the low-pass filter 80. The first derivative signal of the input signal indicates the presence of a peak on the input signal, because the first derivative signal passes through a zero crossing at the time the slope of the input signal changes from one polarity to another, that is, at the peak of the signal. The second derivative signal has a leading edge which also coincides with the position of the peak of the input signal with respect to time. The signal from the low-pass filter 80 is free of high frequency noise signals.

As will be described in detail with reference to FIG. 2, the input signal must meet three requirements before any signal is provided by the AND gate 60. The requirements are: (1) the first derivative signal must pass through a zero crossing in order to provide a meaningful second derivative signal; (2) the amplitude of the second derivative signal must exceed a predetermined threshold level; and (3) the frequency of the input signal must be below the predetermined frequency, which is the upper limit of the filter 80. The three requirements tend to reduce the possibility of noise passing through the AND gate 60. The signal provided by the AND gate 60 has identifiable characteristics which relate to the position of the peak of the input signal with respect to time. Preferably the leading edge of the signal provided by the AND gate 60 is comparable in time to the positive going crossing of its base line of the first derivative signal, and therefore the leading edge of the signal provided by the AND gate 60 is comparable, with respect to time, to the position of the peak of the input signal.

Differential amplifier 90 receives and amplifies the signal from the AND gate 60. Differentiator 100 differentiates the signal from the differential amplifier 90 to provide a spike signal of relatively short time duration.

A multivibrator 110 receives and is triggered by the spike signal from the differentiator 100. The output of the multivibrator 110 at terminal 114 is a square wave signal, with the leading edge of the square wave representing the exact position with respect to time of the peak on the input signal. The other output of multivibrator 110 at terminal 120 is the complement of the signal at terminal 114. A reset pulse may also be supplied to the multivibrator 110 from an external source (not shown) to ready it quickly to receive the next signal from differentiator 100.

Figure 2:
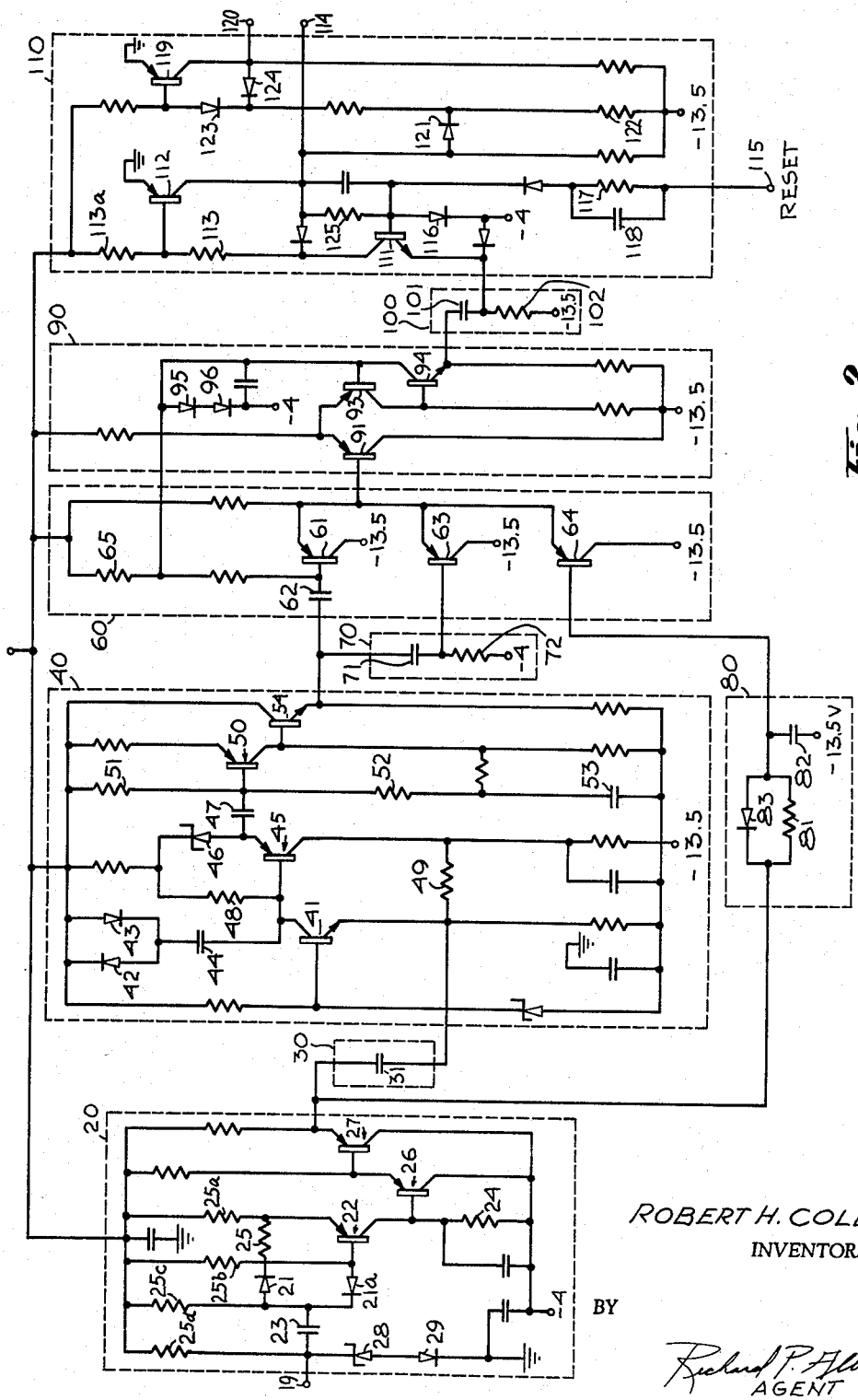
FIG. 2 is a schematic diagram of the circuit.
Figure 3:
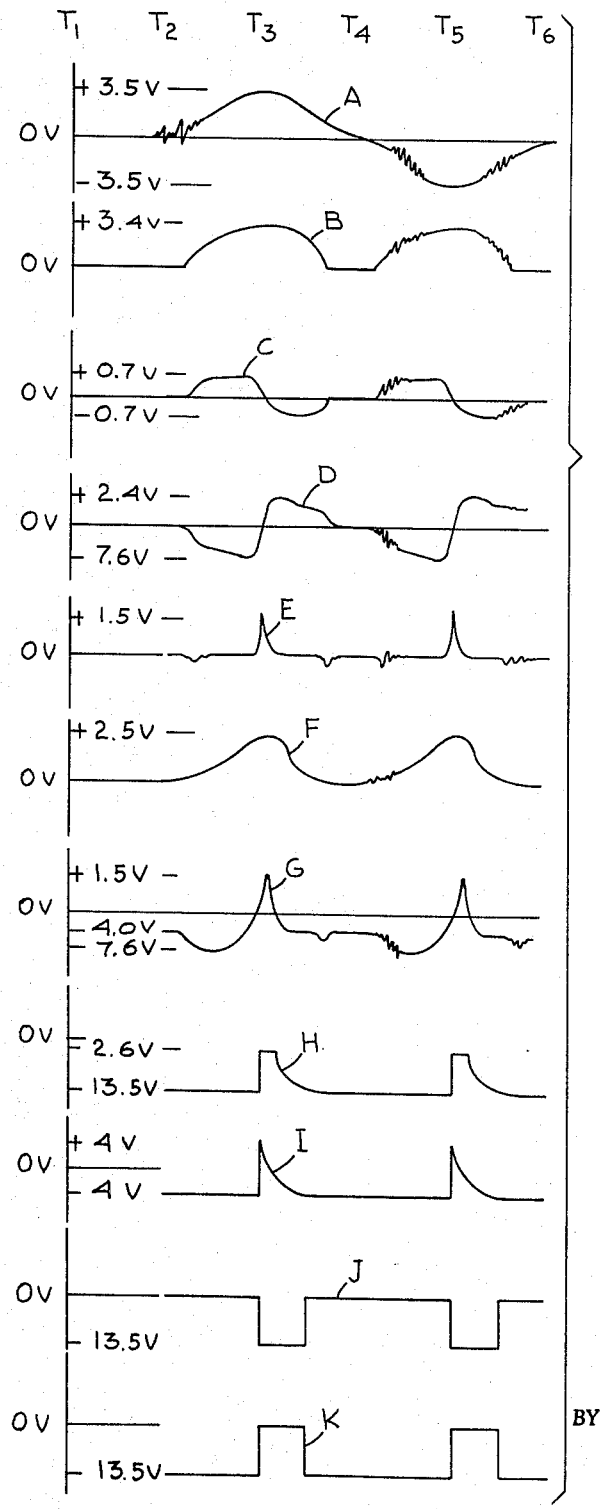
FIG. 3 is a series of waveforms useful in understanding the invention.

A more detailed understanding of the invention may be obtained from the following description of preferred circuitry as shown in FIG. 2, along with the pertinent waveforms shown in FIG. 3.

*Amplifier 20*

A typical bipolar input signal is shown in FIG. 3 as waveform A. The waveform A shows noise superimposed on the signal at times $t_2$ and between the times $t_4$ and $t_6$. Approximate typical voltage values are used for purposes of explanation, with the maximum amplitudes of the input signal being +3.5 volts and −3.5 volts. The input signal may be supplied to an input terminal 19 from a pick-up circuit or other means (not shown).

The amplifier 20 contains means to clip the input signal comprising diodes 21 and 21a, means to rectify the input signal comprising diodes 21, 21a and transistor 22, and means for amplifying the input signal comprising transistors 22, 26, and 27.

A capacitor 23 is electrically connected to the input terminal 19. Both sides of the capacitor 23 are electrically connected to a source of +13.5 volts through resistors 25c and 25d. Two oppositely-connected diodes 21 and 21a are likewise connected on both sides to the positive potential of +13.5 volts through the resistors 25, 25a, 25b, and 25c. A transistor 22 has its emitter connected to diode 21 through resistor 25 and to +13.5 volts through resistor 25a; its base is connected directly to diode 21a (at +13.5 volts); and its collector is connected to −4 volts through a resistor 24. An input signal appearing on terminal 19 has its base line raised by the capacitor 23; that is, if the signal at terminal 29 has a base line of 0 volt and goes positive by 3 volts, the diode side of capacitor 23 goes positive from, for example, +13.5 volts to +16.5 volts. This signal reverse biases diode 21a but forward biases diode 21. This forward biases the base emitter path of transistor 22, and, therefore, transistor 22 conducts. The base of a transistor 26 is electrically connected to the collector of the transistor 22, and its collector is connected to −4 volts. When transistor 22 is not conducting, the base of transistor 26 is at a more negative potential than its emitter, and transistor 26 is conducting. However, the base potential of transistor 26 rises when transistor 22 conducts. This rise in the base potential of transistor 26 is not sufficient, however, to cut off transistor 26, but merely reduces the amount of conduction. The collector of a transistor 27 is electrically connected to the collector of transistor 26, and its base is connected to the emitter of transistor 26. Transistor 27 is also conducting when transistor 22 is non-conducting. However, the conduction of transistor 22 causes the transistor 26 to reduce its conduction. This causes the voltage level on the emitter of transistor 26 to rise, thereby raising the potential on the base of transistor 27. The rise in potential on the base of transistor 27 causes the transistor 27 to conduct less, thereby raising the voltage level on the emitter of transistor 27. The waveform at the emitter of transistor 27 is shown by the waveform B in FIG. 3.

It can be seen that any input signal appearing at terminal 19 which is below the voltage required to make the diodes 21 and 21a conduct will not influence the transistor 22 and will not cause transistor 22 to conduct. Also, any signal which passes through the diodes 21 or 21a has the lower portion of the signal clipped, because of the voltage drop across the diodes and, therefore, that portion of the signal does not pass to the transistor 22.

A positive input signal causes diode 21a to be reverse biased and diode 21 to be forward biased, causing transistor 22 to conduct. In similar fashion, a negative input signal appearing on terminal 19 reverse biases diode 21 and forward biases diode 21a. The forward biasing of diode 21a reduces the potential on the base of transistor 22 and thereby causes transistor 22 to conduct. It should be noted here that, even though the input pulse on terminal 19 is negative, transistor 22 conducts, and the resultant signal on the emitter of transistor 27 is of the same polarity as if a positive signal on terminal 19 had caused transistor 22 to conduct; in other words, diodes 21, 21a and transistor 22 rectify the incoming signal.

Diodes 28 and 29, which are electrically connected between the input to amplifier 20 and ground, serve as protective devices such that, in the event of a malfunction of any circuit which is electrically connected to the input, the diodes 28 and 29 limit the maximum voltage at the input of amplifier 20. Under normal operation of the circuit, the series combination of diodes 28 and 29 provides a high input impedance and does not interfere with or distort the input signal.

*Differentiator 30*

A capacitor 31 is electrically connected to the emitter of the transistor 27. The pulse signal input to the capacitor 31 is always positive pulses, as described above. The current through the capacitor 31 is the differential signal and is detected by transistor 41, which is the input transistor in the amplifier 40. The signal appearing at the collector of transistor 41 is shown by waveform C in FIG. 3 to have both positive and negative excursions.

Amplifier 40

The amplifier 40 is, in the present case, a four-stage amplifier, which inverts as well as amplifies the differential input signal. Amplifier 40 also contains clamping means to maintain the amplitude of the output signal of its first stage within predetermined limits. The output signal from the amplifier 40 is shown by waveform D in FIG. 3.

The emitter of transistor 41 is also electrically connected to the output of the differentiator 30. The collector of the transistor 41 is electrically connected to the base of a transistor 45 in the second stage of the amplifier. The collector of transistor 41 is also connected to the positive potential source by way of capacitor 44 and oppositely-connected diodes 42 and 43. The transistor 41 is normally conducting because its base is positive with respect to its emitter. However, when a pulse is received from the differentiator 30, this pulse, when positive, tends to drive the transistor 41 out of conduction, that is, raises the emitter potential. As a result, the potential on the collector of transistor 41 also rises. Likewise, when the signal from the differentiator 30 to the emitter of transistor 41 is negative, this tends to drive the transistor 41 further into conduction, which in turn lowers the potential on its collector.

Transistor 45 has its collector electrically connected to —13.5 volts; its emitter is electrically connected to +13.5 volts by way of a diode 46. The emitter of transistor 45 is also connected to the base of transistor 45 by way of diode 46 and resistor 48. Since transistor 45 is a PNP transistor, a positive signal appearing on the collector of transistor 41, and consequently on the base of transistor 45, tends to drive transistor 45 out of conduction; conversely, a negative signal on the collector of transistor 41 and the base of transistor 45 tends to drive the transistor 45 into conduction.

The diodes 42 and 43 clamp the amplitude of the signal appearing at the collector of transistor 41 within predetermined limits, such, for example, as between plus and minus 0.7 volt. The limits are determined by the break-down potentials of the diodes. The clamping action keeps transistor 41 operating in its linear region of amplification and at the same time provides a symmetrical output signal of known amplitude. The capacitor 44 serves to provide direct current blocking between the clamping diodes 42 and 43 and the collector of transistor 41.

The connection of the emitter of transistor 45, through the diode 46 and resistor 48, to its base provides positive feedback from the emitter to the base, thereby increasing the gain of the transistor 45. The collector of transistor 45 is also connected to the emitter of transistor 41 through a resistor 49. This connection of the collector of transistor 45 to the emitter of transistor 41 provides stabilization of the operating limits of transistors 41 and 45.

A transistor 50, in the third stage of the amplifier, has its base electrically connected to the emitter of transistor 45 through capacitor 47. The base of transistor 50 is also electrically connected to the positive potential supply through a resistor 51 and is electrically connected to the negative potential supply through a resistor 52 and a capacitor 53. When transistor 45 receives a positive potential at its base tending to drive the transistor out of conduction, the potential at the emitter of transistor 45 rises; therefore, the potential at the base of transistor 50 rises. Since transistor 50 is also a PNP transistor, this rise in potential tends to drive it out of conduction. Conversely, a negative signal at the base of transistor 45 tends to drive transistor 45 into conduction, thereby lowering the potential on the emitter of transistor 45 and, consequently, lowering the potential on the base of transistor 50 and driving transistor 50 into conduction. Thus, transistor 50 inverts the signal and amplifies it.

Transistor 54 is the fourth stage of the amplifier 40 and has its base electrically connected directly to the collector of transistor 50. A positive potential at the base of transistor 50 tends to drive the transistor 50 out of conduction, thereby lowering the potential at its collector and on the base of transistor 54; a negative potential on the base of transistor 50 tends to drive the transistor 50 into conduction, thereby raising the potential on the base of transistor 54. Transistor 54, being an NPN transistor, is driven into conduction by a positive pulse at its base, which tends to raise the voltage level at its emitter; a negative pulse at the base of transistor 54 tends to lower the voltage level at its emitter. The transistor 54 provides current amplification, and the output of the amplifier 40 is taken from the emitter of transistor 54. The output of amplifier 40 is a signal which is representative of the first derivative of the pulse input signal to amplifier 20.

Differentiator 70

The emitter of transistor 54 in the amplifier 40 is electrically connected to the differentiator 70, which comprises a capacitor 71 and a resistor 72. Thus, the output signal of differentiator 70 across the resistor 72 represents the second derivative of the pulse input signal to amplifier 20. Because of the inherent, well known function of a resistance-capacitance differentiator, a significant output signal is provided only when the input signal has a steep slope. Therefore, the differentiator 70 is relatively insensitive to low frequency noise signals. The output signal of differentiator 70 is shown by waveform E in FIG. 3.

Low-pass filter 80

Low pass filter 80 is directly connected to the emitter of transistor 27 in the amplifier 20. Therefore, the positive pulses appearing on the emitter of transistor 27 appear at the input of low-pass filter 80. These pulses are filtered with respect to frequency by a resistor 81 and a capacitor 82, the capacitor serving to short-out high frequency pulses such as noise pulses. However, capacitor 82 must discharge between low frequency pulses, and, therefore, a diode 83 is provided to by-pass the resistor 81. Actually, the capacitor 82 starts to discharge shortly after the peak of the input pulse appears across the resistor 81. This means that the downward side of the output pulse appearing across the capacitor 82, as shown by waveform F in FIG. 3 is asymmetrical with respect to the forward side of the pulse.

"AND" gate 60

The AND gate 60 comprises three PNP transistors 61, 63, and 64 having their emitters connected together. The base of the transistor 61 is connected to the emitter of transistor 54 in the amplifier 40 by a capacitor 62. The capacitor 62 permits lowering of the base line of the signal appearing at the emitter of transistor 54, which is the first derivative signal of the input signal, as shown by waveform D in FIG. 3. The base of the transistor 63 is electrically connected directly to the output of the differentiator 70. The signal appearing at the base of transistor 63 is the second derivative of the input signal, as shown by waveform E in FIG. 3. The base of transistor 64 is electrically connected to the low-pass filter 80, and the signal appearing at the base of transistor 64 is shown by waveform F in FIG. 3. The emitters of the transistors 61, 63 and 64 are electrically connected to the positive potential source (+13.5 volts), and the collectors are connected to —13.5 volts. Because the transistors are PNP type, at least one of the transistors will conduct continuously, so long as the potential applied to any one of the bases does not rise above +13.5 volts. Because the emitter-collector circuits of the transistors are connected in parallel, the potential on the emitter's is always approximately equal to the lowest base voltage of any one of the transistors. The output signals of the differentiator 70 and low-pass filter 80 have base lines that are at approximately —4 volts, whereas the signal applied to the base of transistor 61 has a base line which has been raised to approximately −2.6 volts. (The latter base line is determined by the voltage drop across a pair of diodes located in the differential amplifier 90 to be later described.) Therefore, the potential appearing at the emitters of transistors 61, 63, and 64 is approximately −4 volts. However, when the voltage on the base of transistor 61 drops to below −4 volts, the voltage at the emitters of the three transistors also drops. Thus, if different signals are applied to the three bases, the level of the signal at the emitters of the three transistors can only rise as high as the lowest potential signal applied to any one of the bases of the transistors. For example, if signals of −8 volts, −6 volts, and −4 volts are applied to respective transistor bases, the emitter potential will be substantially −8 volts. If, now, the signals change of +10 volts, +4 volts, and +1 volt, the emitter potential will rise to +1 volt. Thus, when signals having waveforms D, E and F (FIG. 3) are applied to the bases of transistors 61, 63, and 64, respectively, the signal appearing at the emitters is a combination of those signals, as shown by waveform G. This signal appearing at the emitters of the three transistors is the output of the AND gate 60.

Differential amplifier 90

The differential amplifier 90 comprises three transistors 91, 93 and 94. The base transistor 91 is electrically connected directly to the emitters of the three transistors of the AND gate 60 to receive the output signal from the gate (waveform G). The base of transistor 93 is electrically connected into the base circuit of gate transistor 61. The emitters of transistors 91 and 93 are electrically connected to the positive potential source, while the collectors of transistors 91 and 93 are electrically connected to the negative potential source. Transistor 94 has its base connected to the collector of transistor 93. The collector of transistor 94 is electrically connected to the base of transistor 93, and the emitter of transistor 94 is electrically connected to the negative potential source.

Without the presence of a signal at the base of transistor 91, the base potential is negative relative to the emitter potential because of the negative potential of the emitters of gate transistors 61, 63, and 64. Therefore, transistor 91 conducts and, in effect, short-circuits transistor 93. This means that transistor 93 is not conducting, and so the collector of transistor 93 and the base of transistor 94 have approximately −13.5 volts applied thereto. Transistor 94 is an NPN transistor, and therefore, with a negative potential applied to its base, the transistor 94 is cut off and its emitter remains at approximately −13.5 volts. The emitter of transistor 94 provides the output signal of the differential amplifier 90. However, when the signal applied to the base of transistor 91 becomes more positive, the current through transistor 91 is lessened, thus raising the potential of its emitter and the emitter of transistor 93. Therefore, transistor 93 conducts. This raises the base potential of transistor 94 and causes transistor 94 to conduct, thereby raising the voltage level on its emitter to provide an output signal.

It should be noted that the base of transistor 93 is electrically connected to a negative potential provided from a voltage divider comprising diodes 95 and 96 and a resistor 65 in the AND gate 60. This negative potential is also connected to the base of transistor 61 of the AND gate 60, as previously mentioned. As a result, the base of transistor 61 is maintained at approximately −2.6 volts because of the voltage drop across the diodes 95 and 96. Also the base of transistor 93, in differential amplifier 90, is maintained at approximately −2.6 volts, which may be considered as a reference voltage. This reference voltage also causes the output signal on the emitter of transistor 94 to remain at or below −2.6 volts, as is shown by waveform H in FIG. 3.

Differentiator 100

Differentiator 100 comprises a capacitor 101 and resistor 102. One side of capacitor 101 is electrically connected to the emitter of transistor 94, and the other side of capacitor 101 is electrically connected to a negative potential through resistor 102. The capacitor differentiates the signal appearing on the emitter of transistor 94 in the differential amplifier 90 and shown as waveform H in FIG. 3, and provides an output which is a short spike signal, as shown by waveform I in FIG. 3.

Multivibrator 110

The multivibrator 110 comprises three transistors 111, 112, and 119. The transistor 111 is responsive to the input signal, and the transistor 112 is responsive to the condition of transistor 111. The transistor 119 provides the complement of the signal appearing on the collector of transistor 112.

Transistor 111 is normally conducting because it has its emitter electrically connected to the negative output of the differentiator 100. Without any pulse signal on the output differentiator 100, the potential applied to the emitter of transistor 111 is approximately −4 volts (−4 volts being the base line of the signal from differentiator 100 developed across the resistor 102). The collector of transistor 111 is connected by way of resistors 113 and 113a to a positive potential. The base of transistor 111 is electrically connected to a negative potential, for example, −4 volts, by way of diode 116. The breakdown voltage of the diode 116 is sufficient to cause the potential at the base of transistor 111 to be something above −4 volts, which is the potential of the emitter of the transistor. Consequently, transistor 111, being an NPN type, is normally conducting. The base of transistor 112 is electrically connected to the collector of transistor 111 by way of resistor 113.

The emitter of transistor 112 is electrically connected to ground, and the collector of transistor 112 is electrically connected to the terminal 114, which provides one output means of the multivibrator 110. Since transistor 111 is conducting, the potential at the base of transistor 112 is lowered and actually becomes negative. This causes transistor 112 to conduct, and, therefore, the potential at output terminal 114 remains at approximately 0 volt. However, when a positive pulse signal appears on the emitter of transistor 111, this causes the potential on the emitter to become higher than the base potential of transistor 111, thereby shutting off the transistor. Since there is no current through transistor 111, the potential at the base of transistor 112 rises, thereby taking transistor 112 out of the conducting state. This causes the potential at the terminal 114 to drop to approximately −13.5 volts.

A reset clock pulse is applied to a reset terminal 115 from an external source (not shown). The reset pulse appearing at terminal 115 supplies a positive base potential to transistor 111 which places transistor 111 in a conducing state. The transistor 111, being in a conducting state, causes transistor 112 to conduct, and, therefore, the potential at terminal 114 is brought back to zero. It should be noted that when transistor 112 is on, it also supplies a less negative base potential to transistor 111 by way of resistor 125, thereby maintaining both transistors 111 and 112 in a conducting state until a positive pulse signal appears at the emitter of transistor 111.

A resistor 117 and a capacitor 118 connected in parallel in the reset circuit provide an initial, relatively large voltage spike to the base of transistor 111. The resistor 117 actually limits the current flow into the base of transistor 111, but in the initial stage it is desirable to have a large spike pulse, and capacitor 118 permits the spike to pass to the transistor until such time as capacitor 118 is charged. It should also be noted that the reason for differentiating the input pulse signal in differentiator 100 is to provide a spike pulse to the emitter of transistor 111. If a long duration pulse were applied to transistor 111, the transistor 111 could not respond to the reset pulse applied to terminal 115 until the pulse applied to transistor 111 had terminated. Consequently, it is desirable to switch transistor 111 with short duration, spike pulses.

As stated above, transistor 119 provides a complement to the signal appearing on terminal 114. When transistor 112 is turned on, current flows through diode 121 and the resistor 122. The current passing through the diode 121 and resistor 122 raises the voltage level at the base of transistor 119 and consequently places the transistor 119 in a non-conducting state. When transistor 112 is conducting, therefore, transistor 119 is not conducting, and an output terminal 120, which is electrically connected to the collector of transistor 119, is at the —13.5 volt level. When transistor 112 is turned off, the diode 121 is reverse biased, thus preventing current from passing through the diode 121. This lowers the base voltage of the transistor 119, which, in turn, allows transistor 119 to conduct. The conduction of transistor 119 raises the voltage level at the terminal 120 to approximately ground or 0 volt because the emitter of the transistor is grounded. Diodes 123 and 124 prevent transistor 119 from saturating, thereby allowing a faster switching rate.

Although a bistable multivibrator 110 has been shown, which requires the use of a reset pulse, it is understood that a one-shot multivibrator with a sufficiently short relaxation time can be used in its place.

In summary, the circuit of the subject invention detects the peaks of pulse input signals. The output of the circuit, taken from the multivibrator 110 on terminals 114 and 120, is a square wave, with the leading edge of the square wave representing the position of the peak of the input pulse signal with respect to time. The waveforms have been shown without the inherent constant time delay. The constant time delay inherent in the circuit is the same for all pulses and therefore does not affect the accuracy of the output of the circuit.

A plurality of these circuits, when used in conjunction with a multi-channel magnetic pick-up head, provides an output from each of the circuits which indicates the presence or absence of a pulse input signal on the different channels. Each of the output pulses of the circuits reading from each of the channels has its leading edge coinciding in time with the leading edge of the output pulses of the other circuits. This information is easily handled by a computer without the computer having to determine which output pulses should be in line or combined and which pulses are in the past or next time position. It should be noted that the output pulses of the circuit are in line with the times that the input pulses reach their peaks, and, regardless of the signal shaping characteristics of the different pick-up heads, the circuit provides a square wave pulse which truly represents the position of the pulse input signal.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A circuit for detecting the peak of an electrical pulse input signal in the presence of electrical noise, the circuit comprising:
    means for receiving said pulse input signal and providing a first electrical signal representative of a first derivative of said pulse input signal;
    means for receiving said first signal and providing a second electrical signal representative of a second derivative of said pulse input signal; and
    means for receiving said first and second signals and said pulse input signal and providing a third electrical signal only when said first and second signals and said pulse input signals are received simultaneously, said third signal having an identifiable characteristic representing, with respect to time, the position of the peak of said pulse input signal.

2. A circuit for detecting the peak of an electrical pulse input signal in the presence of electrical noise, the circuit comprising:
    means for receiving said pulse input signal and providing a first electrical signal representative of a first derivative of said pulse input signal;
    means for receiving said first signal and providing a second electrical signal representative of a second derivative of said pulse input signal;
    means for receiving said pulse input signal and providing a third electrical signal when the frequency of said pulse input signal is below a predetermined frequency; and
    means for receiving said first, second and third signals and providing a fourth electrical signal when said first, second and third signals are received simultaneously, said fourth signal having an identifiable characteristic representing, with respect to time, the position of the peak of said pulse input signal.

3. A circuit for detecting the peak of an electrical pulse input signal in the presence of electrical noise, the circuit comprising:
    first means for receiving said pulse input signal and providing a first electrical signal representative of a first derivative of said pulse input signal;
    second means for receiving said first signal and providing a second electrical signal representative of a second derivative of said pulse input signal;
    third means for receiving said pulse input signal and providing a third electrical signal when the frequency of said pulse input signal is below a predetermined frequency; and
    gate means for receiving said first, second and third signals and providing a fourth electrical signal when said first, second and third signals are received simultaneously, said fourth signal having a steep leading edge representing, with respect to time, the position of the peak of said pulse input signal.

4. The circuit defined by claim 3 and further comprising:
    differentiator means connected to receive said fourth signal and provide a spike output signal coincident in time with said steep leading edge of said fourth signal.

5. The circuit defined by claim 3 and further comprising:
    differentiator means connected to receive said fourth signal and provide a spike output signal coincident in time with said steep leading edge of said fourth signal; and
    multivibrator means connected to receive said spike output signal and provide a substantially square wave signal having a steep leading edge representing, with respect to time, the position of the peak of said pulse input signal.

6. The circuit defined by claim 3, wherein said first and second means comprise differentiators and said third means includes a low-pass filter.

7. The circuit defined by claim 3, wherein said gate means is an AND gate.

8. A circuit for detecting the peak of an electrical pulse input signal in the presence of electrical noise, the circuit comprising:
    first differentiating means for receiving said pulse input signal and providing a first electrical signal representative of a first derivative of said pulse input signal;
    second differentiating means for receiving said first signal and providing a second electrical signal when said first signal changes from one polarity to another;

low-pass filter means for receiving said pulse input signal and providing a third electrical signal when the frequency of said pulse input signal is below a predetermined frequency; and AND gate means for receiving said first, second and third signals and providing a fourth electrical signal when said first, second and third signals are received simultaneously, said fourth signal having a steep leading edge representing, with respect to time, the position of the peak of said pulse input signal.

9. The circuit defined by claim 8 and further comprising:

differentiator means connected to receive said fourth signal and provide a spike output signal coincident in time with said steep leading edge of said fourth signal.

10. The circuit defined by claim 8 and further comprising:

differentiator means connected to receive said fourth signal and provide a spike output signal coincident in time with said steep leading edge of said fourth signal; and multivibrator means connected to receive said spike output signal and provide a substantially square wave signal having a steep leading edge representing, with respect to time, the position of the peak of said pulse input signal.

11. The device as claimed in claim 8 wherein said AND gate means comprises:

a first transistor having a base and an emitter with its base electrically connected to receive said first signal;

a second transistor having a base and an emitter with its base electrically connected to receive said second signal; and a third transistor having a base and an emitter with its base electrically connected to receive said third signal;

the emitters of said first, second and third transistors being connected together and to output means.

12. A circuit for detecting an electrical pulse input signal having a peak, the circuit comprising:

a first differentiating capacitor-resistor means electrically connected to receive said input signal for providing a first electrical signal representative of a first derivative of said pulse input signal;

a second differentiating capacitor-resistor means electrically connected to receive said first signal for providing a second electrical signal representative of the second derivative of said pulse input signal;

resistor-capacitor low-pass filter means electrically connected to receive said pulse input signal for providing a third electrical signal when the frequency of said input signal is less than a predetermined frequency;

a first transistor having a base and an emitter with its base electrically connected to receive said first signal;

a second transistor having a base and an emitter with its base electrically connected to receive said second signal;

a third transistor having a base and an emitter with its base electrically connected to receive said third signal;

said first, second, and third transistors having their emitters electrically connected together, whereby when said first, second, and third signals are present simultaneously a fourth electrical signal is provided on the emitters of said transistors;

a third differentiating circuit electrically connected to the emitters of said transistors for providing a fifth electrical signal representative of a first derivative of said fourth signal; and multivibrator means connected to receive said fifth signal and provide a substantially square wave signal having a steep leading edge representing, with respect to time, the position of the peak of said pulse input signal.

References Cited by the Examiner
UNITED STATES PATENTS

| | | | |
|---|---|---|---|
| 1,315,539 | 9/19 | Carson | 328—164 |
| 2,446,567 | 8/48 | White et al. | 318—18.1 |

ARTHUR GAUSS, *Primary Examiner.*